INVENTOR.
WILLIAM J. BOW
BY
Richard H. Thomas
ATTORNEY

United States Patent Office 3,552,754
Patented Jan. 5, 1971

3,552,754
TUBE PLATE SEAL
William J. Bow, Morristown, N.J., assignor, by mesne assignments, to the United States of America as represented by the Secretary of the Interior
Continuation of application Ser. No. 622,813, Mar. 13, 1967. This application Sept. 15, 1969, Ser. No. 861,219
Int. Cl. B61f *15/22;* F16j *9/04*
U.S. Cl. 277—178                                    3 Claims

ABSTRACT OF THE DISCLOSURE

A tube to tube plate seal wherein the plate is provided with holes through which the tubes extend, comprising a molded cylindrical resilient insert to be disposed between the tube and tube plate having at one end a radially extending flange engaging a surface of the tube plate, at the other end an inwardly tapered inner surface engaging the outside of the tube, and intermediate the tapered end and flange, a peripheral raised area engaging the plate and holding the insert within the plate hole and the tapered end in sealing engagement with the tube.

---

This application is a continuation of application Ser. No. 622,813, filed Mar. 13, 1967, and now abandoned.

The present invention relates to improvements in a tube to tube plate seal, and in particular to a sealing arrangement suitable for use with tube bundles of condensers and flash distillation units.

In such units it is common practice to provide an outer shell into a plurality of tandem arranged different pressure chambers with division or support plates between the chambers. Bundles of condenser tubes extend lengthwise through the shell passing through holes in each division or support plate, and means must be provided for sealing adjacent chambers from each other. There are numerous prevailing practices for the reduction of leakage and loss of pressure between the different pressure chambers or zones. One such practice is the installation of thermoplastic sleeves between the tubes and the inside surfaces of the holes in the division plates. In some instances a thick division plate is used with close-hole tolerances. Also used are permeable fiber inserts which swell to a tight closure when wet, neoprene O rings, or elastomeric gaskets or sealants which are contiguous with one side of the support plate. All of these sealing methods have shortcomings in that they preclude either easy insertion of the tube bundles, or easy removal of the same for tube replacement.

The present invention overcomes the above disadvantages by providing a molded cylindrical resilient insert adapted to be disposed between the tubes and hole surfaces of the tube plates. The insert includes at one end a radially extending flange engaging a first side of the tube plate. The insert includes at the other end a tapered constricting inside surface having an inside diameter which creates an interference fit of the insert with the outside surface of the tube. Between the ends of the insert, the insert is further provided with a peripheral raised portion spaced from the insert flange a distance sufficient to engage the side of the tube plate opposite said first side, the raised portion holding the insert within the plate hole and the insert tapered end in sealing engagement with the tube.

Figure 1:
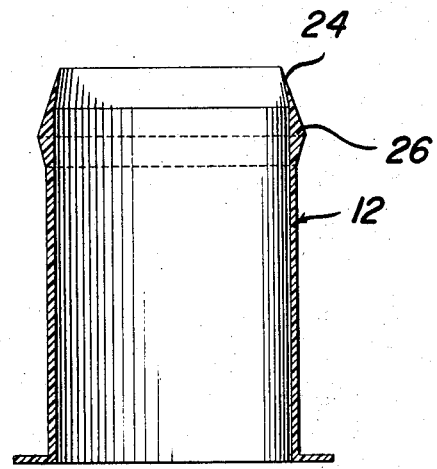
Figure 2:
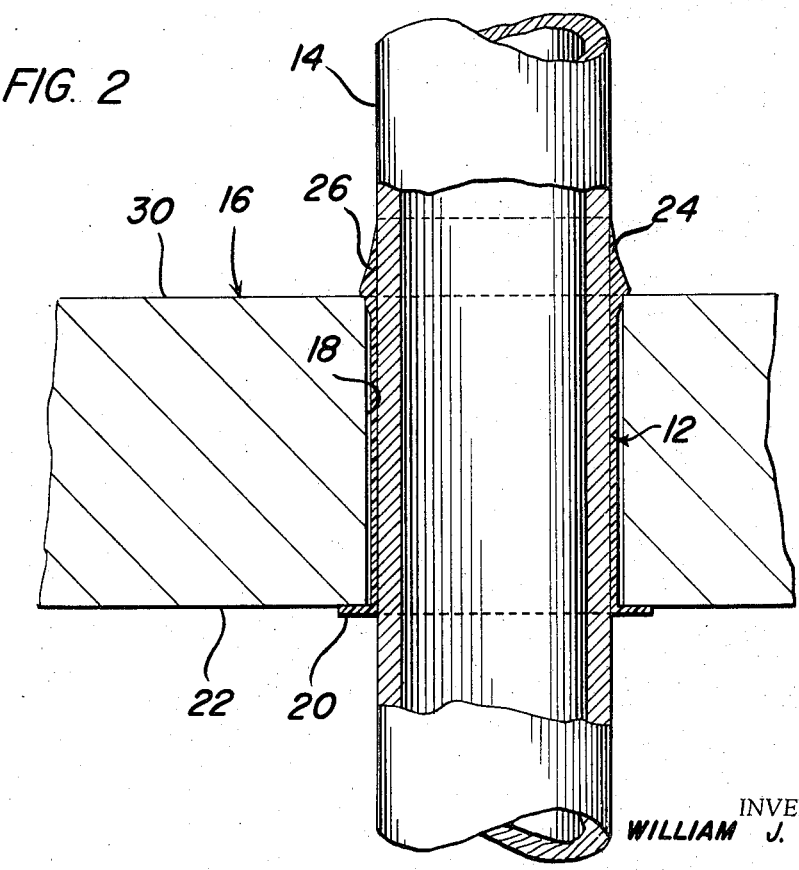

The invention and advantages thereof will become apparent upon further consideration of the specification, with reference to the accompanying drawings, in which FIG. 1 is a section view of the insert in accordance with the invention; and FIG. 2 is a section view showing the insert in sealing engagement between a tube and tube plate in accordance with the invention.

Referring to the figures, the insert 12 is disposed between the tube 14 and tube plate 16 within the tube plate hole or opening 18. The insert 12 is a molded cylindrical piece, of a resilient plastic material, having an outside diameter approximately equal to the inside diameter of the tube plate with a clearance, however, which permits easy insertion of the insert within the tube plate hole. At one end of the insert, there is provided a radially extending flange portion 20 engaging a first surface 22 of the tube plate. At the opposite end, the insert is provided with an inwardly tapered portion 24, which is dimensioned not only to have an interference fit with the outside diameter of the tube, but also to facilitate insertion of the insert within the plate hole, the tip of end 24 having a diameter substantially less than the diameter of hole 18. Between the tapered end and flanged end, but contiguous with the tapered end, the insert is provided with a peripheral raised portion 26 which is spaced from the flange 20 a distance approximately equal to the thickness of the tube plate, so that the raised portion 26 engages a corner of the plate opening contiguous with the second surface 30 of the plate.

The cross-section of the peripheral raised portion is triangular, the sloping surface adjacent tapered end 24 permitting easy insertion of the insert within the hole (the tapered end 24 being inserted first in the hole), the opposite side of the raised area engaging a corner of the plate hole adjacent surface 30. The sloping surface on this side of the raised area permits withdrawal of the insert from the hole 18, if necessary, and further provides a means for improved contact of the insert with the adjacent corner of the plate hole allowing for tolerances in dimensions of the respective components.

The tube which is to be inserted within the tube plate has a certain clearance with the insert, for easy insertion. However, the tube outside surface is tightly engaged by the constricting or tapered end 24 of the insert, because of dimensions of the latter. The outward pressure of the tube outside surface on the tapered end 24 of the insert forces the raised portion 26 into tight engagement with the tube plate, thereby holding the insert securely in the plate opening, and thereby also providing a strong seal.

One important use for the insert is in a multi-stage flash evaporator wherein a plate or number of plates will divide the evaporator into a number of different pressure sections. Condenser tube bundles extend through the sections and the seals in accordance with the invention maintain the differential pressures between sections or stages of the evaporator. At the same time, the seal performs the important function of electrically insulating the metallic tubes from the separation plates of the evaporator, which are also metallic.

Another important use for the seals is in a multistage condenser wherein the condensers will have different pressure sections for exhausting different stages of a turbine. Again, tubes extend through separation plates of the condenser and the seals maintain the necessary differential pressures from stage to stage.

In either event, it is apparent that there are a large number of tubes which require sealing. The present invention provides an effective seal which can be inexpensively effected. The invention also avoids the need for deburring or chamfering a tube plate, and also facilitates removal and reinsertion of tubes if required. Other advantages will be apparent to those skilled in the art.

Although the invention has been described with respect to a specific embodiment, variations within the scope of the claims will be apparent to those skilled in the art.

What is claimed is:
1. In the combination of a planar tube plate having a tube with an uninterrupted continuous cylindrical outer surface extending through a hole in said plate, the walls of said hole comprising an uninterrupted continuous cylindrical surface out of contact with said tube, and a resilient insert surrounding said tube and disposed between the tube and the walls of said hole to seal the tube in the plate and prevent the passage of gas between the tube and the walls of said hole, the improvement comprising said insert comprising:
  (a) a central portion coaxial with said tube and extending substantially along the entire length of said hole so that one end of said portion is adjacent one side of said plate, and the other end of said portion is adjacent the other parallel side of the plate, said portion being out of contact with the walls of said hole;
  (b) an outwardly extending flange integral with said one end of said central portion, said flange lying against said one side of said plate;
  (c) a first annular portion integral with the other end of said central portion, said first annular portion tapering inwardly toward said tube, the extremities of said first annular portion being in direct tight engagement contact with said uninterrupted continuous cylindrical outer surface of said tube; the inner diameter of said first annular portion being substantially smaller than the outer diameter of said tube at its uninterrupted continuous cylindrical outer surface when said resilient insert is not disposed between said tube and said walls of said hole, so that said first annular portion is continually stressed outwardly by said direct contact with said tube, and so that a gas seal is provided between said tube and said insert; said first annular portion being immediately adjacent said other end of said central portion of said insert so that said stress on said first annular portion continually outwardly stresses said other end of said central portion; and
  (d) a second annular portion integral with said central portion adjacent said other end, and extending outwardly from said central portion, said second annular portion positioned partially within said hole and touching said uninterrupted continuous cylindrical wall surface of said hole at the corner of said hole adjacent said other side of said plate to thereby engage said plate, said second annular portion being immediately adjacent said other end of said insert so that said outward stress on said other end continually outwardly stresses said second annular portion into tight engagement with said corner of said plate hole and thereby into tight engagement with said plate so as to provide a gas seal between said plate and said insert.

2. The insert of claim 1 wherein said first annular portion extends outwardly from said other end of said central portion.

3. The insert of claim 1 wherein said second annular portion is triangular in cross section to define an annular outwardly flared surface, said surface lying partly within and partly without said hole, the part positioned outside of said hole being distorted to engage said other side of said plate.

References Cited
UNITED STATES PATENTS

| | | | |
|---|---|---|---|
| 2,454,707 | 11/1948 | Meyers et al. | 285—192X |
| 3,033,624 | 5/1962 | Biesecker | 285—S.F. |

FOREIGN PATENTS

| | | | |
|---|---|---|---|
| 1,421,551 | 11/1965 | France | 277—178 |

SAMUEL B. ROTHBERG, Primary Examiner

U.S. Cl. X.R.
16—2; 285—192